(12) United States Patent
Kobayashi (10) Patent No.: US 10,904,400 B2
(45) Date of Patent: Jan. 26, 2021

(54) INFORMATION PROCESSING APPARATUS AND NON-TRANSITORY COMPUTER READABLE MEDIUM FOR DETERMINING A RESPONSE TO CORRECTIVE STEP

(71) Applicant: FUJI XEROX CO., LTD., Tokyo (JP)

(72) Inventor: Yutaka Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/686,263

(22) Filed: Nov. 18, 2019

(65) Prior Publication Data
US 2020/0389560 A1 Dec. 10, 2020

(30) Foreign Application Priority Data

Jun. 6, 2019 (JP) ................................ 2019-106340

(51) Int. Cl.
*H04N 1/00* (2006.01)
*G06Q 10/06* (2012.01)
*G06Q 10/00* (2012.01)

(52) U.S. Cl.
CPC ... *H04N 1/00084* (2013.01); *G06Q 10/06311* (2013.01); *G06Q 10/20* (2013.01); *H04N 1/00053* (2013.01); *H04N 1/00408* (2013.01); *H04N 1/00477* (2013.01)

(58) Field of Classification Search
None
See application file for complete search history.

(56) References Cited

U.S. PATENT DOCUMENTS

| 8,164,778 | B2 | 4/2012 | Kaneko |
| 9,838,552 | B2 | 12/2017 | Kaneko |
| 2009/0213418 | A1* | 8/2009 | Kaneko .............. H04N 1/00344 358/1.15 |
| 2017/0006171 | A1* | 1/2017 | Kaneko .............. H04N 1/00055 |

FOREIGN PATENT DOCUMENTS

| JP | 2009-206788 A | 9/2009 |
| JP | 2017-16393 A | 1/2017 |

\* cited by examiner

*Primary Examiner* — Mohammad H Ghayour
*Assistant Examiner* — Pawan Dhingra
(74) *Attorney, Agent, or Firm* — Oliff PLC (57) ABSTRACT

An information processing apparatus includes a controller that performs control to cause a related device to perform a corrective step, the related device installed in an organization in which a target device is installed, if a condition to determine that the target device is in a verification necessity status is satisfied in response to presence or absence of a notification repeatedly received from the target device, and a determination unit that determines a necessity for dispatching a maintenance crew to the target device in response to results of the corrective step.

5 Claims, 5 Drawing Sheets

| DEVICE ID | CLIENT COMPANY NAME | ESTABLISHMENT NAME | DEVICE ADMINISTRATOR | MAINTENANCE CREW ID | NETWORK ADDRESS | LAST NOTIFICATION TIME |
|---|---|---|---|---|---|---|
| 0000001 | COMPANY A | ESTABLISHMENT 1 | AAA | abcd000 | 192.168.1.0 | 2019/04/8 17:15 |
| 0000002 | COMPANY A | ESTABLISHMENT 1 | BBB | abcd000 | 192.168.1.0 | 2019/04/15 17:05 |
| 0000003 | COMPANY A | ESTABLISHMENT 1 | CCC | abcd000 | 192.168.2.0 | 2019/04/15 17:20 |
| ... | ... | ... | ... | ... | ... | ... |
| 0000018 | COMPANY A | ESTABLISHMENT 2 | DDD | bdce234 | 192.168.11.0 | 2019/04/15 17:30 |
| ... | ... | ... | ... | ... | ... | ... |

INFORMATION PROCESSING APPARATUS AND NON-TRANSITORY COMPUTER READABLE MEDIUM FOR DETERMINING A RESPONSE TO CORRECTIVE STEP

CROSS-REFERENCE TO RELATED APPLICATIONS

This application is based on and claims priority under 35 USC 119 from Japanese Patent Application No. 2019-106340 filed Jun. 6, 2019.

BACKGROUND

(i) Technical Field

The present disclosure relates to an information processing apparatus and a non-transitory computer readable medium.

(ii) Related Art

Some management apparatuses monitor statuses of multi-function devices (such as a printer, scanner, copying machine, and/or fax machine) installed in facilities of clients via a network, such as the Internet, and perform billing operation, deliver expendable supplies, and dispatch maintenance crew.

In such a system, a device transmits to the management apparatus a notification periodically, for example, at a fixed time every day. By periodically receiving the notification (hereinafter referred to as "periodic notification"), the management apparatus recognizes that the device is operating. If the periodic notification is not consecutively received predetermined times, the management apparatus determines that the device is in a verification necessity status and arranges for a maintenance crew to be dispatched. The maintenance crew dispatched checks the device for any fault. If the device is faulty, the maintenance crew fixes the device. A user may sometimes intentionally switch off the device and the device may happen to be switched off at the time of transmission of the periodic notification. Even if the periodic notification fails to be received once or twice, the management apparatus does not determine that the device is in a verification necessity status. When the periodic notification has not been received consecutively predetermined times, the management apparatus determines that the device is in a verification necessity status. If the device has a minor fault or malfunctions, it transmits to the management apparatus a notification notifying of the fault or malfunction. The management apparatus determines from the notification whether to dispatch a maintenance crew and arranges for the maintenance crew to be dispatched as appropriate.

Japanese Unexamined Patent Application Publication No. 2009-206788 discloses a method used by a management server. The management server manages multiple image forming apparatuses that are communicable with each other and performs an operation to dispatch a maintenance crew for an image forming apparatus. The management server detects an image forming apparatus that involves dispatch of a maintenance crew in accordance with a first analysis process that uses operation information and/or fault information related to multiple image forming apparatuses stored on a random-access memory (RAM). In response to the detection of the image forming apparatus that involves dispatch of the maintenance crew, the management server detects an image forming apparatus that involves dispatch of a maintenance crew in accordance with a second analysis process that uses the stored operation information and/or stored fault information related to the multiple image forming apparatuses.

Japanese Unexamined Patent Application Publication No. 2017-016393 discloses a method used in a management server. The management server receives from a sales company as a user company a message that is to be displayed on a screen of an image processing apparatus and generates page information including the message and first instruction information corresponding to a received instruction. The image processing apparatus periodically makes to the management server a first inquiry about the first instruction information to the image processing apparatus, displays in a status display region of a display thereof a message responsive to a notification that is based on the first instruction information from the management server, acquires using a web browser from the management server the page information including the message related to the first instruction information, and displays the page information on the display.

In a management method, a maintenance crew is dispatched to a target device if the target device is determined to be in a verification necessity status in accordance with the presence or absence of a notification supposed to repeatedly be received from the target device. According to this method, the maintenance crew is dispatched for an event that is so simple that a user of the target device may control the event that has triggered the verification necessity status. This results in a costly operation.

SUMMARY

Aspects of non-limiting embodiments of the present disclosure relate to reducing maintenance crew dispatch related costs more than in a management system in which a maintenance crew is dispatched to a target device if the target device is determined to be in a verification necessity status.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a controller that performs control to cause a related device to perform a corrective step, the related device installed in an organization in which a target device is installed, if a condition to determine that the target device is in a verification necessity status is satisfied in response to presence or absence of a notification repeatedly received from the target device, and a determination unit that determines a necessity for dispatching a maintenance crew to the target device in response to results of the corrective step.

BRIEF DESCRIPTION OF THE DRAWINGS

Exemplary embodiment of the present disclosure will be described in detail based on the following figures, wherein.

DETAILED DESCRIPTION

A system including a device management apparatus 300 as an example of an information processing apparatus of an exemplary embodiment of the disclosure is described below with reference to FIG. 1.

Figure 1:
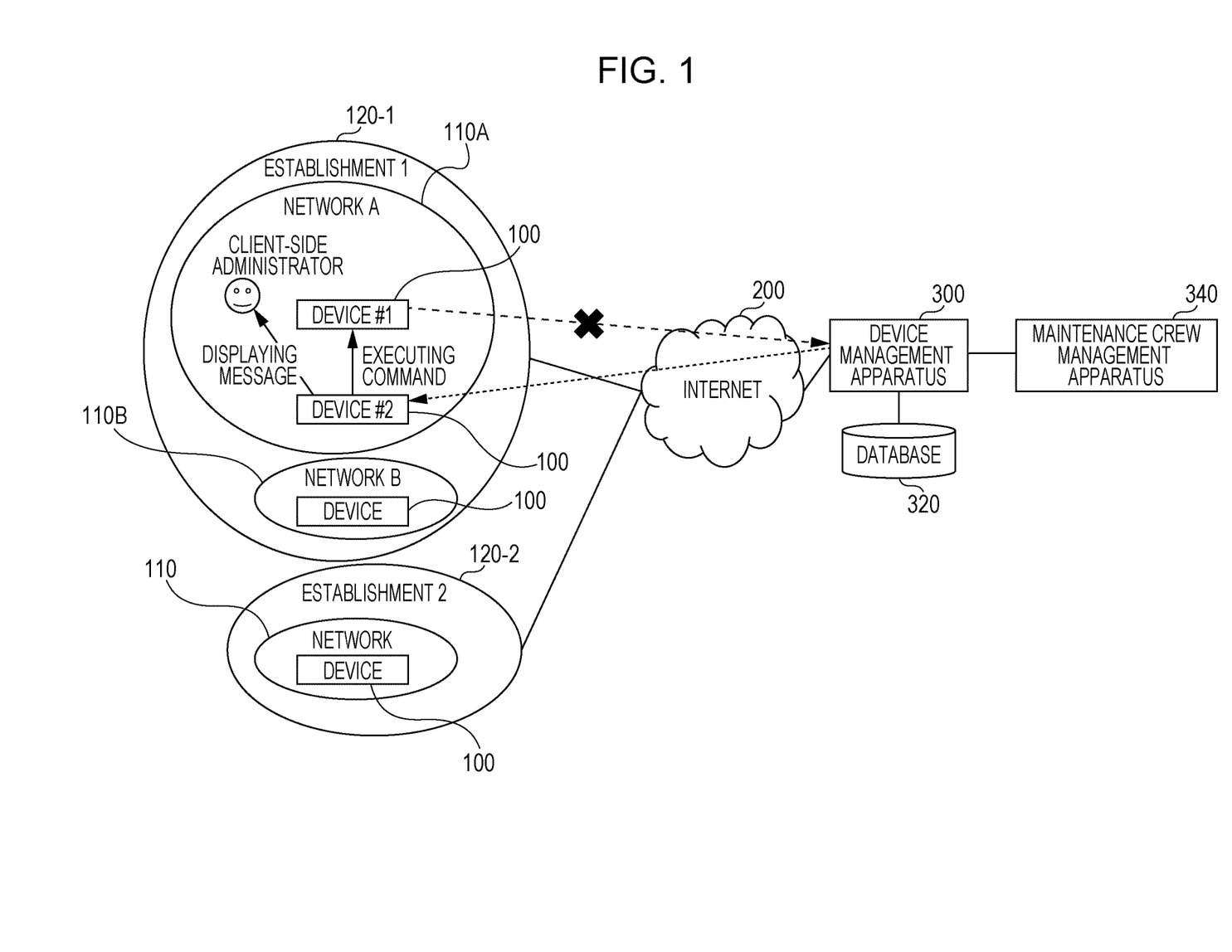
FIG. 1 illustrates a system including a device management apparatus serving as an example of an information processing apparatus of an exemplary embodiment of the disclosure.

Referring to FIG. 1, a device 100 is a printer, a copying machine, a fax device or a multi-function device having one or more functions of these devices. The device 100 is installed in a facility, such as an office or office of a user (such as a company). In the following discussion, the facility having the device 100 installed therein is referred to an establishment 120. The device 100 is connected to network 110, 110A, or 110B mounted in the establishment 120 and is further connected to the Internet 200 via the network 110, 110A, or 110B. The network 110A (hereinafter referred to as a "network A") and the network 110B (hereinafter referred to as a "network B") are subnets forming a network in an establishment 120-1 (referred to as an establishment 1 in FIG. 1). Referring to FIG. 1, at least two devices 100, namely, device #1 and device #2, are connected to the network A. The devices 100 are also connected to the network 110 in another establishment 120-2. The establishment is an example of an organization where the device 100 is installed and the network 110 is an example of a network within the organization.

The device 100 periodically notifies a device management apparatus 300 of information representing the status thereof via the Internet 200. The Internet 200 is an example of a network external to the organization.

The information periodically notified by the device 100 includes information on an amount of use of the device 100 (for example, a print count). Such a notification from the device 100 to the device management apparatus 300 is referred to as a periodic notification. Each device 100 periodically transmits the periodic notification at predetermined time intervals (for example, at a fixed time every day). If a predetermined event that is to be notified occurs, the device management apparatus 300 is notified of that event. The events that are to be notified include an occurrence of a fault and the remaining quantity of an expendable supply, such as paper sheet, being lower than a threshold value. The notification of such a predetermined event is referred to as an event notification.

The device management apparatus 300 monitors the status of each device 100 by communicating with each device 100 via the Internet 200 and performs a process to manage each device 100 in accordance with monitoring results. For example, the device management apparatus 300 performs a billing process in response to the periodically received notification about an amount of use of the device 100 (for example, the number of printed sheets). If the device management apparatus 300 determines in accordance with the information contained in the periodic notification or event notification that a maintenance operation, such as part replacement or repair, is to be performed on the device 100, the device management apparatus 300 notifies the maintenance crew management apparatus 340 that the maintenance operation is to be performed on the device 100.

A database 320 stores information on each device 100 managed by the device management apparatus 300. For example, the database 320 stores attribute information on each device 100 and a variety of information notified by the device 100. For example, the attribute information on the device 100 includes information indicating an installation location of the device 100, and information related to a client who uses the device 100 (namely, user). The device management apparatus 300 references data, such as the attribute information on each device 100 stored on the database 320, and performs an operation to manage each device 100.

A maintenance crew management apparatus 340 manages the dispatch of a maintenance crew who maintains the device 100 of a user. The maintenance crew is also referred to as a customer engineer, service engineer, or maintenance crew. The maintenance crew travels to the establishment 120 of the client and performs a maintenance operation on the device 100 installed there. In accordance with information notified by the device management apparatus 300, the maintenance crew management apparatus 340 plans the dispatch of the maintenance crew to the device 100.

The device management apparatus 300 and maintenance crew management apparatus 340 are operated by a service provider who provides a maintenance and management service for the device 100 of the client.

Figure 2:
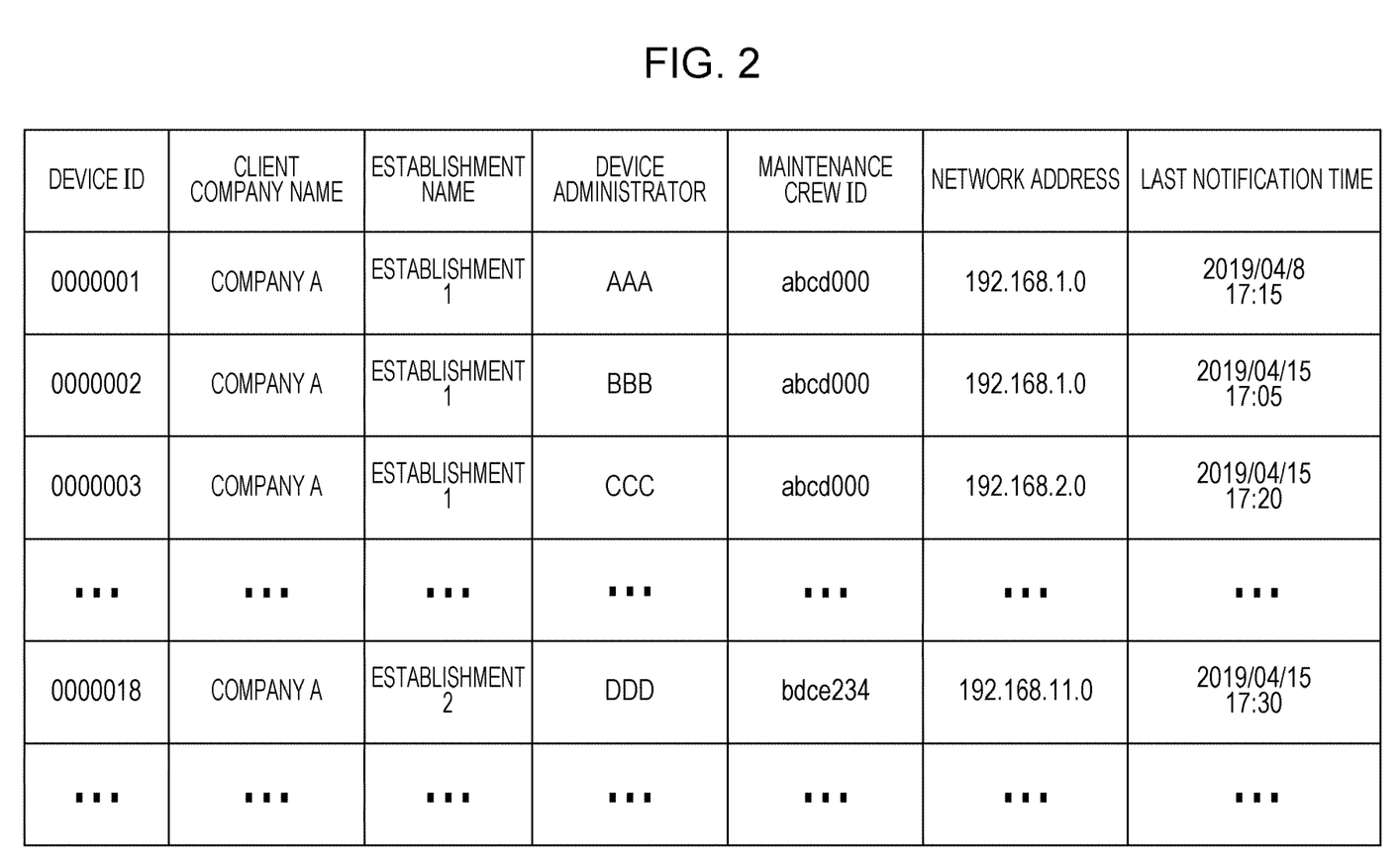
FIG. 2 illustrates an example of attribute information of each device registered on a database.

FIG. 2 illustrates the attribute information on each device 100 registered on the database 320. Referring to FIG. 2, the database 320 registers a device ID serving as identification information of the device 100 in association with information items including a client company name, establishment name, device administrator, in-charge maintenance crew identification (ID), network address, and last notification time. The client company name is the name of a company that uses the device 100. The establishment name is the name of an establishment where the device 100 is installed. The device administrator is one of the employees of the client company who is registered on the device 100 as a person in charge of the management of the device 100. The information including the name of the device administrator and contact information (such as an email address or phone number) is registered at the information item for the device administrator on the database 320. The in-charge maintenance crew ID is identification information of the maintenance crew in charge of the device 100. The network address is a network address of each of the networks 110, 110A, and 110B. The network address is used to identify a device 100 belonging to the same subnet. The Internet protocol (IP) address of the device 100 may be stored in addition to the network address on the database 320. The last notification time indicates the time of last reception of the notification from the device 100. The last notification time is updated each time the device management apparatus 300 receives the periodic notification from the device 100. The last notification time of the device 100 may be the latest reception time of the periodic notification or event notification.

The information items in FIG. 2 are illustrated for exemplary purposes only. The attribute information of the device 100 may not necessarily include all the information items illustrated in FIG. 2 or may further include an additional information item other than those listed. The attribute information on the device 100 to be stored on the database 320 may further include time information related to time of latest use of the device 100 (latest use time).

If the periodic notification has not been received from the device 100 for a certain period of time, the device management apparatus 300 determines that the device 100 is in a verification necessity status. The verification necessity status is a status in which a determination as to whether any fault has occurred in the device 100 is to be made and if a fault has occurred in the device 100, a corrective action is to be made. A condition that the device management apparatus 300 determines that the device 100 is in the verification necessity status is that the next periodic notification has not arrived from the device 100 for a predetermined time elapse (for example, one week) from the last notification time (see FIG. 2) of the device 100 stored on the database 320. Another condition that the device management apparatus 300 determines that the device 100 is in the verification necessity status is that the periodic notification has not arrived consecutively a predetermined number of times. In related art, if the device management apparatus 300 determines that the device 100 is in the verification necessity status, the device management apparatus 300 notifies the maintenance crew management apparatus 340 that the device 100 is in the verification necessity status. In response to the notification, the maintenance crew management apparatus 340 makes a plan to dispatch a maintenance crew to the device 100.

Various causes triggering the verification necessity status are considered. Some of the causes may be relatively easily rectified by the user side. For example, the device 100 may be powered off or a local area network (LAN) cable that is used to connect the device 100 to the network 110 may be pulled off. Dispatching a maintenance crew for a cause that may be easily rectified by the user side leads to an increase in the maintenance costs of the devices 100.

Figure 3:
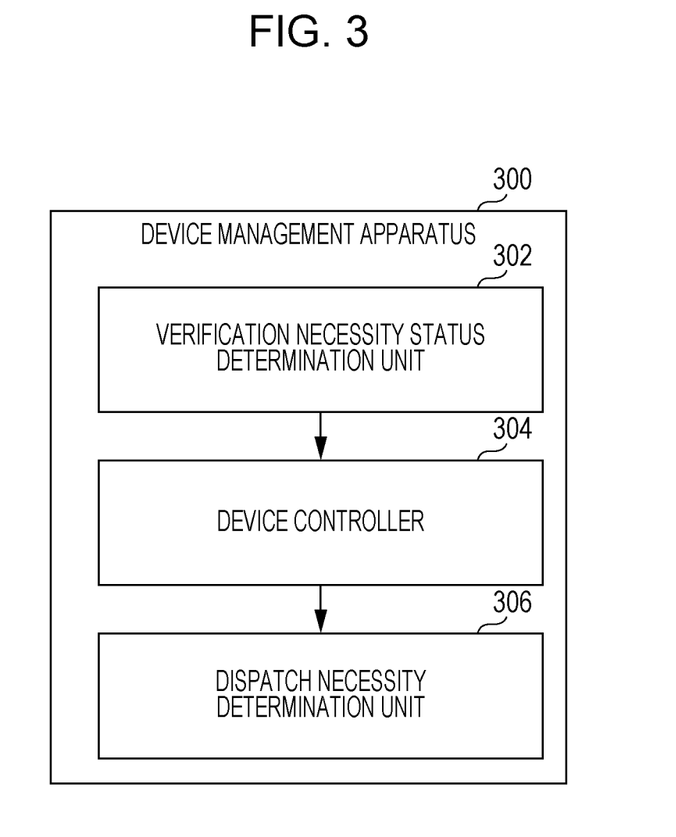
FIG. 3 is a functional block diagram of the device management apparatus.

In the exemplary embodiment described below, if the device management apparatus 300 determines that the device 100 is in the verification necessity status, the device management apparatus 300 determines whether the device 100 is in a status that may be rectified by the user side or involves the maintenance service of a maintenance crew. Only if the device management apparatus 300 determines that the current status of the device 100 involves the maintenance service of the maintenance crew, the device management apparatus 300 notifies the maintenance crew management apparatus 340 that a maintenance crew is to be dispatched. FIG. 3 is a functional block diagram of the determination and notification operation performed by the device management apparatus 300.

Referring to FIG. 3, the device management apparatus 300 includes a verification necessity status determination unit 302, device controller 304, and dispatch necessity determination unit 306. FIG. 3 illustrates one of the functions of the device management apparatus 300 used to determine whether a maintenance crew is to be dispatched to the device 100 in the verification necessity status and the remaining standard functions of the device management apparatus 300 are not illustrated.

The verification necessity status determination unit 302 is a functional module that determines whether the device 100 is in the verification necessity status. For example, the verification necessity status determination unit 302 periodically checks the database 320 for the last notification times (see FIG. 2) of the devices 100 and searches for a device 100 in which a predetermined time has elapsed since the last notification time. If such a device 100 is found, the verification necessity status determination unit 302 determines that the device 100 is in the verification necessity status and notifies the device controller 304 of the device ID of the device 100.

The device controller 304 selects a device related to the device 100 in the verification necessity status that the verification necessity status determination unit 302 has notified. The device controller 304 causes the related device to perform an operation to determine whether the device 100 in the verification necessity status involves the maintenance service of the maintenance crew. The device 100 in the verification necessity status is hereinafter referred to as a target device.

The related device is also in the establishment 120 of the target device and is a currently operative device 100. For example, a message indicating an action to be taken on the target device is displayed on a screen of the related device. A user (for example, a device administrator) in the establishment 120 views the message and takes the action indicated by the message to the target device. The user may easily travel from the related device to the target device since the two devices in the same establishment 120.

In one example, the related device satisfies a condition that the related device and target device are in the same subnet. A device 100 present in the same subnet as that of a target device is more likely physically closer to the target device than a device 100 present in a different subnet.

In another example, the related device may satisfy a condition that the same device administrator is in charge of the related device and the target device. The device administrator among the employees of the client company is a person who is in charge of managing the device. A corrective action to the target device may involve the authority of the device administrator. In order to let the device administrator view the message indicating the corrective action to the target device, the message is to be displayed on the device 100 that the device administrator uses more likely. If the same device administrator is in charge of a device 100 and a target device, the device 100 is more likely used by the same device administrator. If different device administrators are respectively in charge of a device 100 and a target device, the device 100 is less likely used by the same administrator.

The device controller 304 extracts a related device candidate by referencing the database 320, attempts to communicate with the candidate, and selects the candidate as the related device if the communication is successful. The selection of the candidate is performed in accordance with the following conditions.
(1) The device is not in the verification necessity status.
(2) The device and the target device are in the same establishment of the same client company.
(3) The device is the target device are in the same subnet.
(4) The device and the target device are under the same device administrator.
(5) The device has the last notification time that is the latest among the devices given the same conditions.

The conditions (1) and (2) are to be satisfied. Although the conditions (3) and (4) are not necessarily to be satisfied, the condition (3) has a higher priority than the condition (4).

The device controller 304 references the database 320 and searches for a device 100 that satisfies the conditions (1) through (4). If only one such device 100 is found, the device controller 304 sets the device 100 to be the related device. If multiple devices 100 are found, the device 100 having the last notification time that is the latest is set to be the related device in accordance with the condition (5). The device controller 304 attempts to communicate with the candidate thus determined and if the communication is successful, the device controller 304 sets the candidate to be the related device. If the communication is unsuccessful, the device controller 304 searches for a candidate from among the remaining devices 100 and attempts to communicate with the found candidate.

If any device 100 satisfying the conditions (1) through (4) is not found on the database 320, the device controller 304 searches for a device 100 satisfying the conditions (1) through (3). If only one such device 100 is found, that device 100 is set to be a candidate. If multiple devices 100 satisfy the conditions (1) through (3), a device 100 that is selected in accordance with the condition (5) is set to be a candidate. The device controller 304 attempts to communicate with the candidate and if the communication is successful, the device controller 304 sets the candidate to be the related device. If the communication is unsuccessful, the device controller 304 searches for a candidate from among the remaining devices 100 and attempts to communicate with the found candidate.

If the device 100 satisfying the conditions (1) through (3) is not found on the database 320, the device controller 304 searches for a device 100 satisfying the conditions (1) and (2). The process succeeding thereto is identical to that described above.

The device controller 304 performs control to cause the related device thus selected to perform a corrective step to rectify the verification necessity status in the target device.

The corrective step includes an operation to verify the status of the target device via the network 110. The status of the target device that is to be verified relates to whether communication with the target device via the network 110 is possible. If the related device is unable to communicate with the target device via the network 110, the target device may malfunction or be powered off or the LAN cable is pulled off. Another example of the status of the target device that is to be verified through the corrective step is a network setting of the target device. For example, the contents of a setting for a proxy server out of the network setting are to be verified. If information on the proxy server set as the target device is in error, the target device is unable to access the device management apparatus 300 via the proxy server and is unable to notify the device management apparatus 300 of the periodic notification. For example, if the proxy server in the establishment 120 is modified, the network setting of each device 100 in the establishment 120 is modified accordingly. However, some of the devices 100 may not be modified or may suffer from a fault. In such a case, the device 100 is unable to notify the periodic notification to the device management apparatus 300.

The corrective step may include an operation to cause a verification apparatus to display on a screen thereof information indicating a step that is to be attempted on the target device to rectify the verification necessity status. In one example, the step to be attempted is determined in accordance with the results of the verification of the status of the target device and the information on the step is displayed on the related device. If the communication from the related device to the target device via the network 110 is not established, a message is displayed on the screen of the related device to check whether a power plug of the target device is plugged in a wall outlet, the power switch of the target device is turned on, or the LAN cable is pulled off.

Figure 4:
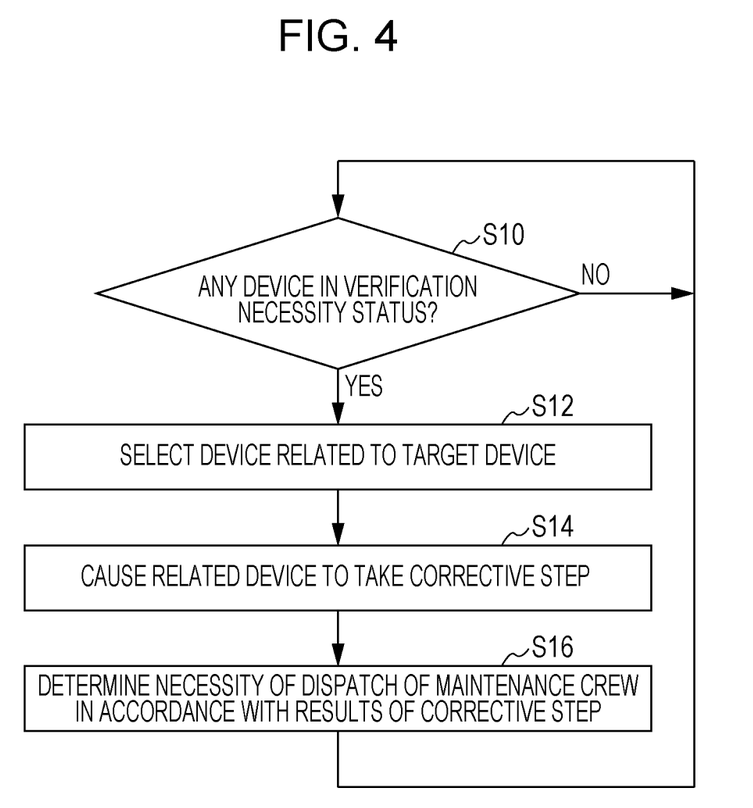
FIG. 4 illustrates a process performed by the device management apparatus.

Referring to FIG. 4, a process performed by the device management apparatus 300 with the device 100 in the verification necessity status is described. The verification necessity status determination unit 302 waits until a device 100 determined to be in the verification necessity status is found (S10). If the device 100 in the verification necessity status is found, operations in S12 through S16 are performed on the device 100 as the target device.

The device controller 304 selects the related device of the target device (S12) and causes the related device to perform the corrective step to the target device (S14). The device controller 304 receives from the related device data indicating the results of the corrective step and transfers the data to the dispatch necessity determination unit 306. In accordance with the results of the corrective step, the dispatch necessity determination unit 306 determines whether to dispatch a maintenance crew to the target device (S16). If the dispatch necessity determination unit 306 determines that the maintenance crew is to be dispatched, the dispatch necessity determination unit 306 notifies the maintenance crew management apparatus 340 that dispatching the maintenance crew to the target device is to be performed.

Figure 5:
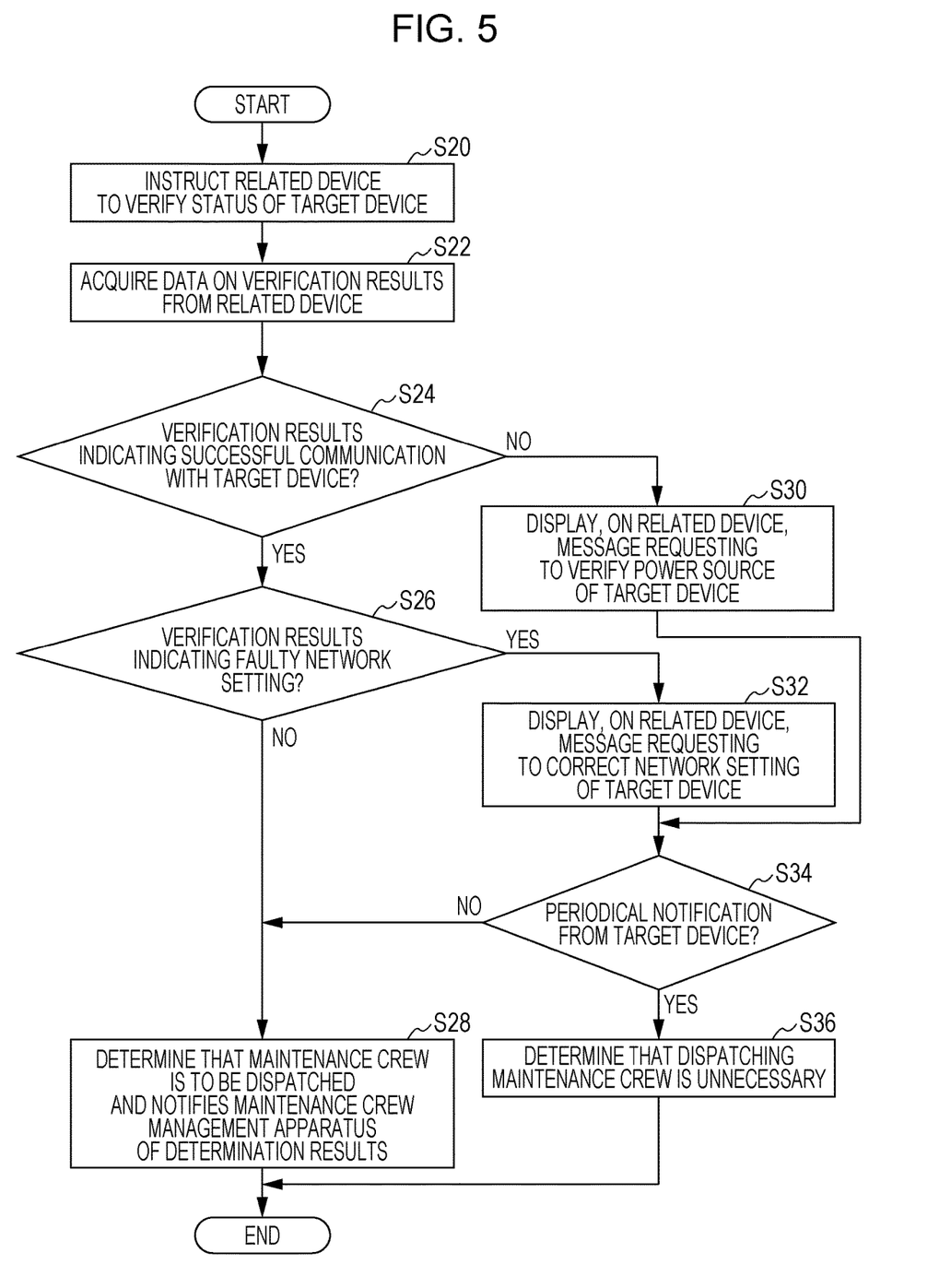
FIG. 5 illustrates in detail a process performed by the device management apparatus.

The operations in S14 and S16 in FIG. 4 are described more in detail with reference to FIG. 5.

In the process in FIG. 5, the device controller 304 transmits an instruction to cause the related device to verify the status of the target device (S20). The instruction includes information identifying the target device (such as device ID or address information such as IP address).

In response to the received instruction, the related device checks whether communication with the target device via the network 110 is possible. To this end, the related device may simply perform a ping command on the target device. If the communication with the target device is unsuccessful (for example, the ping command fails to reach the target device), the related device notifies the device controller 304 of the verification results. If the communication with the target device is successful, the related device acquires information on network setting from management information base (MIB) in the target device by using simple network management protocol (SNMP). The related device compares the network setting thereof with the network setting acquired from the target device (in particular, proxy server setting). Since the related device has communicated with the device management apparatus 300, the network setting of the related device is considered to be correct. If the network setting of the target device is different from the network setting of the related device, the network setting of the target device may be wrong. In such a case, the related device notifies the device controller 304 of the verification results indicating that the network setting of the target device is wrong.

The device controller 304 acquires from the related device the verification results of the status of the target device (S22) and determines whether the verification results indicate a successful communication (S24). The determination results are no (namely, the communication has not been established between the related device and the target device), the device controller 304 transmits to the related device a message prompting the user to check the power plug, power switch, and LAN cable of the target device and causes the related device to display the message on the screen of the related device (S30). The message may be displayed as a banner on the screen of the related device or displayed on an administrator screen displayed on the related device when the administrator logs in on the related device.

If the determination results in S24 are yes (namely, the communication has been established between the related device and the target device), the device controller 304 determines whether the verification results of the network setting indicate a "fault" (S26). If the verification results are yes in S26, the device controller 304 transmits to the related device a message prompting the user to check the network setting of the target device (S32) and causes the related device to display the message on the screen of the related device (S32). The message may include information on the network setting of the related device and may prompt the user to modify the network setting of the target device in accordance with the information. The user (for example, the administrator of the target device and the related device) may view the message and may correct the network setting of the target device in accordance with the message. The message may also include information on the device administrator of the target device. Even if the user having viewed the message is not the administrator, the user with this information may request the administrator to take an action by notifying the administrator of the message.

Subsequent to S30 or S32, the user having viewed the message displayed on the related device or the administrator of the target device notified by the user may check the power of the target device, connection state of the LAN cable, and network setting and then may correct a fault in them if the fault is found there. If the target device is restored to the normal operating state through the corrective step, the target device is going to transmit the periodic notification to the device management apparatus 300 at the next periodic notification timing.

Subsequent to S30 or S32, the dispatch necessity determination unit 306 determines whether the next timing of the periodic notification of the target device has arrived (S34). If the periodic notification has been received, the dispatch necessity determination unit 306 determines that dispatching of the maintenance crew is unnecessary (S36). The verification necessity status is then rectified on the target device.

If the periodic notification has not been received in S34, there is a possibility that the fault in the target device is not rectified through the action by the client side. In such a case, the dispatch necessity determination unit 306 determines that a maintenance crew is to be dispatched to the target device and notifies the maintenance crew management apparatus 340 of the determination results (S28).

If the determination results in S26 are no, the verification necessity status in the target device is not likely rectified through the action by the client side, such as checking the power of the target device, LAN cable, and the network setting. In such a case, the dispatch necessity determination unit 306 determines that a maintenance crew is to be dispatched to the target device and notifies the maintenance crew management apparatus 340 of the determination results (S28).

In the process in FIG. 5, the device management apparatus 300 causes the related device to display the message prompting the user to perform the operation responsive to the verification results of the status of the target device. This is an example of the process only. Alternatively or in addition to the process, a message having the same contents as the prompting message may be sent to the device administrator of the target device via a communication medium, such as an email.

In the process in FIG. 5, the device management apparatus 300 causes the related device to display the message indicating the operation responsive to the verification results after causing the related device to verify the status of the target device (S20 and S22). This process is described for exemplary purposes only. Alternatively, without causing the related device to verify the status of the target device, the device management apparatus 300 may cause the target device to display a message (for example, a combination of messages displayed in S30 and S32) listing operations that the device management apparatus 300 desires the client side to attempt to do.

In accordance with the exemplary embodiment, the operations that are to be carried out by the client side includes checking the power, LAN cable, and network setting of the target device. This process is described for exemplary purposes only. In addition, the occurrence of any fault in the target device may be detectable by the related device via the network 110 and a person on the client side may be prepared to easily rectify the fault. In such a case, the device management apparatus 300 may cause the related device to check the presence or absence of a fault and if a fault is detected, the device management apparatus 300 displays on the related device a message prompting the client side to take a corrective action.

The device management apparatus 300 thus described may be implemented by causing a computer to execute a program representing functions of the device management apparatus 300. The computer includes a circuit configuration including hardware elements that are interconnected via a bus. The hardware elements include a microprocessor, such as a central processing unit (CPU), a temporary memory, such as a random-access memory (RAM) or a read-only memory (ROM), a controller that controls a fixed storage, such as a flash memory, a solid-state drive (SSD), or a hard disk drive (HDD), a variety of input and output interfaces, and a network interface that controls connection with a network, such as a local area network. The program describing process contents of the functions of the device management apparatus 300 is transferred to the computer via the network and stored on the fixed storage, such as the flash memory. The program is thus installed on the computer. The program stored on the fixed storage is read onto the RAM and executed by the microprocessor, such as the CPU. The functional module group described above is thus implemented.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
   a controller that performs control to cause a related device to perform a corrective step, the related device installed in an organization in which a target device is installed, if a condition to determine that the target device is in a verification necessity status is satisfied in response to presence or absence of a notification repeatedly received from the target device; and
   a processor configured to function as a determination unit that determines a necessity for dispatching a maintenance crew to the target device in response to results of the corrective step,
   wherein the controller causes the related device to perform as the corrective step a verification operation to verify a status of the target device, wherein the controller causes the related device to perform as the corrective step a display operation to display an indication that prompts a user to perform an operation to rectify the status of the target device obtained through the verification operation, and wherein the controller causes the related device to perform as the corrective step an acquisition operation to acquire information on a network setting of the target device in one of the statuses and an operation to compare the information on the network setting acquired through the acquisition operation with information on a network setting of the related device, and causes the related device to perform the display operation to display an indication that prompts the user to correct the network setting of the target device if results of comparison indicate that there is a difference between the information on the network setting of the target device and the information on the network setting of the related device.

2. The information processing apparatus according to claim 1, wherein the verification operation verifies whether the target device is in a communicable status via a network within the organization and whether a network setting of the target device to communicate with an apparatus over a network external to the organization is correct, and wherein the determination unit determines that the maintenance crew is to be dispatched if results of the verification operation received from the related device indicate that the target device is operative over the network within the organization and that the network setting of the target device is correct.

3. The information processing apparatus according to claim 1, wherein the controller further causes the related device to perform as the corrective step the display operation to display an indication that prompts a user to verify and correct a predetermined status of the target device.

4. A non-transitory computer readable medium storing a program causing a computer to execute a process for processing information, the process comprising:

performing control to cause a related device to perform a corrective step, the related device installed in an organization in which a target device is installed, if a condition to determine that the target device is in a verification necessity status is satisfied in response to presence or absence of a notification repeatedly received from the target device; and determining a necessity for dispatching a maintenance crew to the target device in response to results of the corrective step;

wherein the control causes the related device to perform as the corrective step a verification operation to verify a status of the target device, wherein the control causes the related device to perform as the corrective step a display operation to display an indication that prompts a user to perform an operation to rectify the status of the target device obtained through the verification operation, and wherein the control causes the related device to perform as the corrective step an acquisition operation to acquire information on a network setting of the target device in one of the statuses and an operation to compare the information on the network setting acquired through the acquisition operation with information on a network setting of the related device, and causes the related device to perform the display operation to display an indication that prompts the user to correct the network setting of the target device if results of comparison indicate that there is a difference between the information on the network setting of the target device and the information on the network setting of the related device.

5. An information processing apparatus, comprising:

controller means for performing control to cause a related device to perform a corrective step, the related device installed in an organization in which a target device is installed, if a condition to determine that the target device is in a verification necessity status is satisfied in response to presence or absence of a notification repeatedly received from the target device; and determination means for determining a necessity for dispatching a maintenance crew to the target device in response to results of the corrective step, wherein the controller means causes the related device to perform as the corrective step a verification operation to verify a status of the target device, wherein the controller means causes the related device to perform as the corrective step a display operation to display an indication that prompts a user to perform an operation to rectify the status of the target device obtained through the verification operation, and wherein the controller means causes the related device to perform as the corrective step an acquisition operation to acquire information on a network setting of the target device in one of the statuses and an operation to compare the information on the network setting acquired through the acquisition operation with information on a network setting of the related device, and causes the related device to perform the display operation to display an indication that prompts the user to correct the network setting of the target device if results of comparison indicate that there is a difference between the information on the network setting of the target device and the information on the network setting of the related device.

* * * * *